United States Patent [19]

Sirota

[11] 4,230,834

[45] Oct. 28, 1980

[54] PRIMERS FOR POLYMERIZABLE ACRYLATE-CHLOROSULFONATED POLYETHYLENE ADHESIVES AND TWO-PART ADHESIVES PREPARED THEREWITH

[75] Inventor: Julius Sirota, South Plainfield, N.J.

[73] Assignee: National Starch and Chemical Corporation, Bridgewater, N.J.

[21] Appl. No.: 969,610

[22] Filed: Dec. 14, 1978

[51] Int. Cl.$^3$ .................. C08L 61/22; C08L 33/12
[52] U.S. Cl. ............................ 525/308; 525/518; 528/269
[58] Field of Search ............ 106/287.18, 287.19, 106/287.30; 528/269, 266, 233; 260/857, 854, 878, 853; 525/308, 518; 252/183.3 R

[56] References Cited

U.S. PATENT DOCUMENTS

| | | | |
|---|---|---|---|
| 3,591,438 | 7/1971 | Toback et al. | 156/310 |
| 3,890,407 | 6/1975 | Briggs, Jr. et al. | 260/878 R |
| 3,962,372 | 6/1976 | Arhart | 260/878 R |

Primary Examiner—Theodore Pertilla
Attorney, Agent, or Firm—Edwin Szala; Ellen T. Dec

[57] ABSTRACT

Primer compositions useful in the cure of adhesive compositions containing acrylate and/or methacrylate monomers, chlorosulfonated polyethylene and a peroxy free radical generator comprise (a) the condensation product of an aldehyde and a primary or secondary amine and (b) a salt of a non-transition metal selected from the group consisting of lead, tin, zinc, calcium, strontium, barium and cadmium. These primers and the two part adhesives prepared therewith are characterized by superior speed of cure and final bond strength.

9 Claims, No Drawings

PRIMERS FOR POLYMERIZABLE ACRYLATE-CHLOROSULFONATED POLYETHYLENE ADHESIVES AND TWO-PART ADHESIVES PREPARED THEREWITH

BACKGROUND OF THE INVENTION

I. Field of the Invention

The present invention is directed to novel primer compositions useful in the cure of adhesive compositions containing acrylate and/or methacrylate monomers, chlorosulfonated polyethylene and a peroxy free radical generator and to two-part adhesive compositions prepared therewith.

II. Brief Description of the Prior Art

Adhesive compositions based on a solution of a chlorosulfonated polyethylene or a mixture of sulfonated chloride and chlorinated polyethylene in a polymerizable vinyl monomer are described in U.S. Pat. No. 3,890,407. The vinyl monomers include, for example, acrylic and methacrylic acid, vinylidene chloride, styrene and alkyl substituted styrene, with the preferred monomers being lower alkyl acrylates and methacrylates and ethylene glycol diacrylate and dimethacrylate. These adhesives are hardened (polymerized) in the presence of a polymerization catalyst which preferably includes a peroxide free radical generator, an aldehyde-amine condensation product as an accelerator, a tertiary amine initiator, and an organic salt of a transition metal as a promotor. The promotors specifically referred to are cobalt, nickel, manganese or iron naphthenate, copper octanoate, iron hexanoate, or iron propionate. These promotors and their use in conjunction with aldehyde-amine condensation products as primers for acrylate-based adhesives are described in greater detail in U.S. Pat. No. 3,591,438, wherein the promotors are defined as "oxidizable transition metals", i.e. those oxidizable metals having their valence electrons in a "d" subshell and comprising Classes IIIb, IVb, Vb, VIb, VIIb, VIIIb and Ib on the periodic chart of elements.

SUMMARY OF THE INVENTION

I have now found a new primer for such chlorosulfonated polyethylene/acrylate adhesives which, not only is surprisingly effective in view of the teachings of the prior art, but indeed is, in many ways, improved over the previously employed systems. Thus, I have found that the speed of cure and final bond strength of peroxy initiated adhesives based on acrylate and/or methacrylate monomers with chlorosulfonated polyethylene can be improved by treating one or more of the surfaces to be bonded with a primer comprising (a) the condensation product of an aldehyde and a primary or secondary amine and (b) a salt of a non-transition metal selected from the group consisting of lead, tin, zinc, calcium, strontium, barium, and cadmium. The primers of my invention may be formulated into the adhesive system so as to form a two-part system wherein one part is a solution of polymer and catalyst and the other part contains the primer, both parts being premixed immediately prior to use, or it may be used in a two-part system wherein the primer and the adhesive components are applied separately to the surface(s) to be bonded.

The invention therefore also discloses a two-part adhesive composition comprising (1) an acrylate or methacrylate monomer, a chlorosulfonated polyethylene component and a peroxy polymerization initiator; and (2) an aldehyde amine condensation product and a salt of a non-transition metal selected from the group consisting of lead, tin, zinc, calcium, strontium, barium and cadmium.

The use of the specific non-transition metals in the primers of the present invention generally imparts overall improved handling and performance characteristics to the total adhesive system over those characteristics observed using the transition metals required in the prior art. Thus, the final bonds obtained in accordance with the present invention are generally stronger than those produced using copper salts (the preferred metal of the prior art) and tend to be more uniform, especially in thicker films, i.e. over 5 mils. Moreover, problems previously associated with premature surface reaction or "case hardening" and resultant weak, brittle bonds are essentially eliminated.

DETAILED DESCRIPTION OF THE PREFERRED EMBODIMENTS

The adhesive compositions which are to be cured with the primers of the present invention are those containing acrylic and/or methacrylic monomers, chlorosulfonated polyethylene or a mixture of sulfonyl chloride with chlorinated polyethylene catalyzed by a peroxy containing free radical generator. These adhesives are described in U.S. Pat. No. 3,890,407, the disclosure of which is incorporated herein by reference.

The chlorosulfonated polyethylene compositions preferably contain about 25-70 weight percent chlorine and about 3-160 mmoles sulfonyl chloride moiety per 100 grams of polymer and the polyethylene from which the chlorosulfonated or chlorinated polyethylene is prepared should have a melt index of about 4-5000. Suitable chlorosulfonated polyethylene polymers can be prepared in a manner well known to those skilled in the art by reaction of linear or branched polyethylene and sulfonyl chloride or sulfur dioxide and chlorine. Chlorosulfonated polyethylene is also available commercially, for example, from E. I. duPont de Nemours & Co. under the tradename "Hypalon". In practice the chlorosulfonated polyethylene may also be a chlorosulfonated copolymer of ethylene with small proportions of propylene or other olefins. Alternatively, sulfonyl chloride and chlorinated polyethylenes of suitable molecular weight can be used. The sulfonyl chlorides can be mono- or poly-functional and can be $C_1$–$C_{12}$ alkyl sulfonyl chlorides, $C_6$–$C_{24}$ aromatic sulfonyl chlorides such as benzene or toluene sulfonyl chloride. Some sulfonyl chlorides containing hetero atoms have also been found to work, such as diphenylether-4,4'-sulfonyl chloride. For convenience our use of the term "chlorosulfonated polyethylene" shall be understood to designate any of the above materials. The adhesive compositions also contain at least one acrylic or methacrylic monomer. Suitable acrylic or methacrylic monomers include methacrylic acid, acrylic acid, methyl methacrylate, ethyl methacrylate, acrylonitrile, methacrylonitrile, methyl acrylate, ethyl acrylate, butyl methacrylate, cyclohexyl methacrylate, 2-ethylhexyl methacrylate, glycidyl methacrylate, ethylene glycol dimethacrylate, and acrylamide. Mixtures of these monomers may also be employed. Minor amounts of other vinyl monomers may be used in place of or in addition to the acrylic and methacrylic monomer. For example, styrene and substituted styrene, vinylidene chloride, vinyl acetate, vinyl propionate, and vinyl methyl ether may be used in the formulations depending on the desired end use properties.

The adhesive compositions also contain a polymerization catalyst (free radical generator). Suitable catalysts are organic peroxides and hydroperoxides, preferably selected from the class consisting of cumene hydroperoxide, benzoyl peroxide, t-butyl perbenzoate, lauroyl peroxide, di-t-butyl diperphthalate, t-butyl peracetate, t-butyl hydroperoxide, and p-methane hydroperoxide. Mixtures of the above catalysts may also be used. The amount of catalyst employed will normally be within the range of about 0.01 to 10 parts, preferably 0.1 to 5 parts by weight of the entire composition. Additionally, the adhesive composition may contain 2,6-di-t-butyl-4-methylphenol in an amount of about 0.01 to 10 parts by weight of the composition. The latter functions as a stabilizer and its use is described in greater detail in U.S. Pat. No. 3,962,372, the disclosure of which is incorporated herein by reference.

Other additives known to those skilled in the art and employed in such adhesive compositions may also be present herein.

The aldehyde-amine condensation products used as one component of the novel primers of the present invention are also described in U.S. Pat. Nos. 3,890,407 and 3,591,438, the disclosures of which are incorporated herein by reference. Specifically, the condensation product used in the present invention is the condensation reaction product of a primary or secondary amine and an aldehyde. Typical aldehydes employed in the preparation of these products include acetaldehyde, butyraldehyde, propionaldehyde, and hydrocinnamaldehyde. Preferred are the primary amines such as ethyl amine, hexyl amine, aniline, butyl amine and tolyl amines. Particularly preferred are the butyraldehyde-aniline and butyraldehyde-butyl amine condensation products sold by E. I. duPont deNemours & Co. under the tradenames "Accelerator 808" and "Accelerator 833", respectively.

The metals used as the second component in these primers are salts of non-transition metals selected from the group consisting of lead, tin, zinc, calcium, strontium, barium, and cadmium. Organic or inorganic salts may be employed although, for easier solubility, the organic salts are preferred. Typical useful salts include zinc naphthenate, calcium naphthenate, lead naphthenate, barium naphthenate, strontium naphthenate, di-butyl tin dilaurate, and cadmium iodide. It is indeed surprising that primers prepared using the above salts provide satisfactory cures for the acrylate/chlorosulfonated polyethylene based adhesives in view of the fact that they are not of the transition metal type, nor are they of the oxidizable transition metal type, described as critical in the prior art. It is therefore even more surprising that the use of these salts provides, in some cases, superior cures in terms of final tensile strength than the preferred copper salts of the U.S. Pat. No. 3,591,438 as evidenced from the results of the examples presented hereinbelow.

The relative amounts of the components employed varies according to the particular components employed. Generally, the aldehyde-amine is used in amounts of up to 15%, preferably 0.15 to 5% and the non-transition metal is employed at a concentration of up to about 5%, preferably 0.00001–0.5% by weight of the adhesive composition. Within the above ranges, it is also preferable that the ratio of aldehyde-amine condensation product to non-transition metal compound be from about 1:1 to about 15:1.

Depending upon the particular metal salt employed, the salts are provided as solids or in the form of a solution, either volatile or non-volatile and in the latter case may be added directly in that form to the aldehyde-amine condensation product. Generally, when inorganic salts are employed, they are dissolved first in appropriate solvents, e.g. alcohols, prior to addition to the aldehyde-amine.

It may also be desirable and may facilitate application to dilute the primer with a volatile organic solvent, e.g. methylene chloride, acetone, toluene, alcohol or mixtures thereof, adding a small amount of a second or "mutual" solvent, if necessary. The use of such solvent is particularly preferred when the primer is used in the form of a surface activator to be applied directly to at least one of the surfaces to be bonded. Optionally, for such uses the primer may be provided in aerosol form and part, or all, of the solvent comprise a halogenated hydrocarbon or other suitable propellent.

As noted above, the accelerator-promotors can be used in curing the adhesive compositions in a two-part system wherein one part is a solution of the chlorosulfonated polyethylene in a polymerizable acrylate or methacrylate monomer and the peroxide catalyst, and the other part comprises the aldehyde amine and non-transition metal primer and the two parts are combined immediately prior to application. Alternatively, the primer and adhesive solutions may be applied separately to at least one of the surfaces to be bonded.

The following examples are presented merely as illustrative of the present invention, which is not intended to be limited thereto. Unless otherwise stated, all parts are by weight and all temperatures in degrees Celsius.

EXAMPLE 1

A polymerizable bonding adhesive (Part I) was first prepared with the below composition:

| | |
|---|---|
| chlorosulfonated polyethylene [1] | 1224.0 parts |
| methyl methacrylate | 1681.0 parts |
| methacrylic acid | 204.0 parts |
| 1,3 butylene dimethacrylate | 136.0 parts |
| bisphenol A epichlorohydrin [2] condensate | 102.0 parts |
| camene hydroperoxide | 34.0 parts |
| 2,6-di-tertiary butyl-4 methyl phenol | 5.1 parts |

[1] Hypalon 20 (duPont)
[2] Epon 828 (Shell)

The above Part I was then used to test the various primers (Part II) described in Table I. These are all based on a butyraldehyde-aniline condensation product sold by duPont under the name "Accelerator 808". Various controls are also included as indicated in Table I. The copper naphthenate (8% Cu) represents the most preferred and used oxidizable transitional metal salt and is shown for comparative purposes.

Clean 1"×4"×18 ga×20 gm cold rolled steel splints were prepared by taping with masking tape to form a 1 sq. in.×7 mil thickness when 2 splints were brought together to form a lap joint arrangement. A Part II primer was then wiped onto the exposed 1 sq. in. surface of a splint and excess adhesive of Part I was then applied to the related surface of another splint. The 2 splints were then overlapped and hand pressed together and excess adhesive removed. Weight measurements indicate that about 0.0017 gms Part II and 0.2326 gms Part I or about 0.73% Part II on Part I was used.

The "joint" was than aged 1 minute and then held horizontally at one end in such fashion as to note any rotational movement of the test area. Any rotation was then corrected by hand to the original position. This procedure was repeated at 2, 3, 5 minute intervals and the time of no rotation noted as the "gel time". Any test over 5 minutes was discontinued as being too slow setting. The splint was then aged 24 hours and a tensile strength run on the Instron (½ in./minute). This test was repeated with all the other Part II compositions and their respective "gel times" and "tensiles" also recorded in Table I.

TABLE I

| Composition of Part II | Gel Time (min.) | Tensile lb/in$^2$ |
|---|---|---|
| None | — | Test discontinued |
| Copper Naphthenate (8% Cu) | — | Test discontinued |
| Calcium Naphthenate (5% Ca) | — | Test discontinued |
| Strontium Naphthenate (7% Sr) | — | Test discontinued |
| Barium Naphthenate (6% Ba) | — | Test discontinued |
| Zinc Naphthenate (8% Zn) | — | Test discontinued |
| Cadmium Iodide (2.5% Cd)* | — | Test discontinued |
| Dibutyl Tin Dilaurate (19.1% Tin) | — | Test discontinued |
| Lead Naphthenate (24% Pb) | — | Test discontinued |
| Accelerator 808 | 3 | 1000 |
| 808 + 0.1% Copper Naphthenate (8% Cu) | 1 | 250 |
| 808 + 0.05% Copper Naphthenate | 1 | 560 |
| 808 + 0.025% Copper Naphthenate | 1 | 900 |
| 808 + 0.1% Calcium (5% Ca) Naphthenate | 3 | 1380 |
| 808 + 0.05% Calcium Naphthenate | 3 | 1000 |
| 808 + 0.025% Calcium Naphthenate | 3 | 1260 |
| 808 + 0.1% Strontium Naphthenate (7% Sr) | — | Test discontinued |
| 808 + 0.05% Strontium Naphthenate | 5 | 1520 |
| 808 + 0.025% Strontium Naphthenate | 3 | 1590 |
| 808 + 0.0125% Strontium Naphthenate | 3 | 1910 |
| 808 + 0.1% Barium Naphthenate (6% Ba) | 5 | 1150 |
| 808 + 0.05% Barium Naphthenate | 5 | 1300 |
| 808 + 0.025 Barium Naphthenate | 3 | 1520 |
| 808 + 0.0125 Barium Naphthenate | 3 | 1960 |
| 808 + 0.1% Zinc Naphthenate (8% Zn) | 2 | 1530 |
| 808 + 0.05% Zinc Naphthenate | 2 | 1540 |
| 808 + 0.025% Zinc Naphthenate | 2 | 1200 |
| 808 + 0.1% Cadmium Iodide (2.5% Cd)* | 2 | 1220 |
| 808 + 0.05% Cadmium Iodide | 3 | 1200 |
| 808 + 0.025% Cadmium Iodide | 3 | 950 |
| 808 + 0.1% Dibutyl Tin Dilaurate (19.1% Tin) | 2 | 1040 |
| 808 + 0.05% Dibutyl Tin Dilaurate | 3 | 1090 |
| 808 + 0.025% Dibutyl Tin Dilaurate | 3 | 850 |
| 808 + 0.1% Lead Naphthenate (24% Pb) | 2 | 1380 |
| 808 + 0.05% Lead Naphthenate | 2 | 1180 |
| 808 + 0.025% Lead Naphthenate | 3 | 1320 |

*employed as a solution of 8% CdI$_2$ in alcohol.

Analysis of Table I indicates that although the copper naphthenate is about 1 to 2 minutes faster "gelling", it is subject to much lower tensiles, up to 40% less than some of the non-transition metal salts and somewhat less than even the Accelerator 808 alone. The copper naphthenate is obviously more "concentration dependent" than the non-transition metal compounds used in the present invention.

EXAMPLE II

This example was designed to show the bonding relationships on glass as opposed to metals. The technique was therefore revised to use clean 1"×3"×4 gm microscope slides. A 20 gm brass weight was hung from the end of the lap joint sandwich during the rotational tests so as to be approximately comparable to the 20 gm. steel splints.

TABLE II

| Composition of Part II | Gel Time (min.) | Tensile lb/in$^2$ |
|---|---|---|
| Accelerator 808 | 3 | Glass broke |
| 808 + 0.1% Copper Naphthenate (8% Cu) | 1 | Glass broke |
| 808 + 0.05% Copper Naphthenate | 1 | Glass broke |
| 808 + 0.025% Copper Naphthenate | 2 | Glass broke |
| 808 + 0.1% Calcium Naphthenate (5% Ca) | 3 | Glass broke |
| 808 + 0.05% Calcium Naphthenate | 3 | Glass broke |
| 808 + 0.025% Calcium Naphthenate | 3 | Glass broke |
| 808 + 0.1% Strontium Naphthenate (7% Sr) | 3 | Glass broke |
| 808 + 0.05% Strontium Naphthenate | 3 | Glass broke |
| 808 + 0.025% Strontium Naphthenate | 3 | Glass broke |
| 808 + 0.0125% Strontium Naphthenate | 3 | Glass broke |
| 808 + 0.1% Barium Naphthenate (6% Ba) | 3 | Glass broke |
| 808 + 0.05% Barium Naphthenate | 3 | Glass broke |
| 808 + 0.025% Barium Naphthenate | 3 | Glass broke |
| 808 + 0.0125% Barium Naphthenate | 3 | Glass broke |
| 808 + 0.1% Zinc Naphthenate (8% Zn) | 2 | Glass broke |
| 808 + 0.05% Zinc Naphthenate | 3 | Glass broke |
| 808 + 0.025% Zinc Naphthenate | 5 | Glass broke |
| 808 + 0.1% Cadmium Iodide (2.5% Cd)* | — | Test discontinued |
| 808 + 0.05% Cadmium Iodide | 5 | Glass broke |
| 808 + 0.025% Cadmium Iodide | 3 | Glass broke |
| 808 + 0.1% Dibutyl Tin Dilaurate (19.1% Tin) | 2 | Glass broke |
| 808 + 0.05% Dibutyl Tin Dilaurate | 2 | Glass broke |
| 808 + 0.025% Dibutyl Tin Dilaurate | 3 | Glass broke |
| 808 + 0.1% Lead Naphthenate (24% Pb) | 2 | Glass broke |

TABLE II-continued

| Composition of Part II | Gel Time (min.) | Tensile lb/in² |
|---|---|---|
| 808 + 0.05% Lead Naphthenate | 2 | Glass broke |
| 808 + 0.025% Lead Naphthenate | 3 | Glass broke |

*employed as a solution of 8% CdI₂ in alcohol.

As indicated In Table II, the copper naphthenate was again an insignificant 1 to 2 minutes faster gelling but all broke glass during tensile testing. Obviously, in this less demanding application all samples can be considered approximately equivalent.

Variations may be made in proportions, procedures and materials without departing from the scope of the invention as defined by the following claims.

I claim:

1. A primer for peroxy initiated chlorosulfonated polyethylene/acrylate or methacrylate adhesives comprising (a) the condensation product of an aldehyde and a primary or secondary amine and (b) a salt of a non-transition metal selected from the group consisting of lead, tin, zinc, calcium, strontium, barium and cadmium wherein the ratio of the aldehyde-amine condensation product to the salt of a non-transition metal is from about 1:1 to about 15:1.

2. The primer of claim 1 wherein the aldehyde-amine condensation product is a butyraldehyde-aniline or butyraldehyde-butyl amine condensation product.

3. The primer of claim 1 wherein the metal salt is selected from the group consisting of calcium naphthenate, strontium naphthenate, barium naphthenate, zinc naphthenate, cadmium iodide, dibutyl tin dilaurate and lead naphthenate.

4. The primer of claim 1 wherein the aldehyde amine condensation product is used in amounts of up to 15% and the non-transition metal salt in an amount of up to 5% by weight of the adhesive composition.

5. The primer of claim 1 wherein the aldehyde-amine condensation product is used in an amount of 0.15 to 5% and the non-transition metal salt in an amount of 0.00001% to 0.5% by weight of the adhesive composition.

6. A two-part adhesive which comprises a joined mixture of (1) an acrylate or methacrylate monomer, a chlorosulfonated polyethylene and a peroxy polymerization initiator and (2) an aldehyde-amine condensation product and a salt of a non-transition metal selected from the group consisting of lead, tin, zinc, calcium, barium, strontium and cadmium wherein the aldehyde-amine condensation product is used in an amount of 0.15 to 5% and the non-transition metal salt in an amount of 0.00001 to 0.5% by weight of the adhesive composition and wherein the ratio of the aldehyde-amine condensation product to the non-transition metal salt is within the range of 1:1 to 15:1.

7. The two-part adhesive of claim 6 wherein the aldehyde-amine condensation product of (2) is a butyraldehydeaniline or butyraldehyde-butyl amine condensation product.

8. The two-part adhesive of claim 6 wherein the metal salt of (2) is selected from the group consisting of calcium naphthenate, strontium naphthenate, barium naphthenate, cadmium iodide, dibutyl tin dilaurate and lead naphthenate.

9. The two part adhesive of claim 6 wherein the aldehyde-amine condensation product of (2) is used in amounts of up to 15% and the non-transition metal salt in an amount of up to 5% by weight of the adhesive composition.

* * * * *